United States Patent
Suzuki et al.

(10) Patent No.: US 9,313,634 B2
(45) Date of Patent: Apr. 12, 2016

(54) INFORMATION PROCESSING DEVICE, CONTROL METHOD, AND A NON-TRANSITORY COMPUTER READABLE STORAGE MEDIUM

(71) Applicant: YAHOO JAPAN CORPORATION, Tokyo (JP)

(72) Inventors: Mariko Suzuki, Tokyo (JP); Hiroko Ota, Tokyo (JP); Chiemi Taki, Tokyo (JP); Yuki Uchida, Tokyo (JP); Hiroshi Machida, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 247 days.

(21) Appl. No.: 14/023,725

(22) Filed: Sep. 11, 2013

(65) Prior Publication Data
US 2015/0061825 A1 Mar. 5, 2015

(30) Foreign Application Priority Data

Aug. 28, 2013 (JP) ................................. 2013-177337

(51) Int. Cl.
*G08B 1/08* (2006.01)
*H04W 4/20* (2009.01)
*G06T 13/40* (2011.01)
*G06Q 30/02* (2012.01)
*G06K 9/00* (2006.01)

(52) U.S. Cl.
CPC ........... *H04W 4/206* (2013.01); *G06K 9/00221* (2013.01); *G06K 9/00288* (2013.01); *G06Q 30/0261* (2013.01); *G06Q 30/0267* (2013.01); *G06Q 30/0269* (2013.01); *G06T 13/40* (2013.01)

(58) Field of Classification Search
CPC .................................. H04W 4/00; G09B 19/00
USPC ...................... 340/539.13, 539.11; 706/46, 47
See application file for complete search history.

(56) References Cited

U.S. PATENT DOCUMENTS

| | | | | |
|---|---|---|---|---|
| 6,151,571 A | * | 11/2000 | Pertrushin | G10L 17/26 704/207 |
| 8,700,009 B2 | * | 4/2014 | Quy | H04W 4/00 455/414.1 |
| 2005/0169446 A1 | * | 8/2005 | Randall | H04M 1/576 379/93.23 |
| 2006/0098027 A1 | * | 5/2006 | Rice | H04M 1/576 345/619 |

(Continued)

FOREIGN PATENT DOCUMENTS

| | | |
|---|---|---|
| JP | H09-138767 A | 5/1997 |
| JP | 2001-160021 A | 6/2001 |

(Continued)

OTHER PUBLICATIONS

Jan. 6, 2015 Office Action issued in Japanese Patent Application No. 2013-177337.

*Primary Examiner* — Jennifer Mehmood
*Assistant Examiner* — Rufus Point
(74) *Attorney, Agent, or Firm* — Oliff PLC

(57) ABSTRACT

An information processing device includes a collecting unit which collects user's biological information. The information processing device includes a determining unit which determines an emotion of the user by using the biological information collected by the collecting unit. The information processing device includes an output unit which outputs in association with information representing the user and the emotion of the user determined by the determining unit to terminal devices which are used by other users.

14 Claims, 13 Drawing Sheets

(56) References Cited

U.S. PATENT DOCUMENTS

| | | | | |
|---|---|---|---|---|
| 2007/0196797 A1* | 8/2007 | Mitsuyoshi | G06N 5/00 | 434/236 |
| 2009/0018832 A1* | 1/2009 | Mukaigaito | G10L 15/1815 | 704/251 |
| 2009/0316862 A1* | 12/2009 | Sugimoto | G10H 1/0008 | 379/88.01 |
| 2010/0293473 A1* | 11/2010 | Borst | H04L 12/1827 | 715/741 |
| 2011/0300847 A1* | 12/2011 | Quy | H04W 4/00 | 455/419 |
| 2013/0179512 A1* | 7/2013 | Li | H04L 67/22 | 709/204 |
| 2013/0217350 A1* | 8/2013 | Singh | H04B 1/06 | 455/130 |
| 2013/0238544 A1* | 9/2013 | Kunjithapatham | G06N 3/00 | 706/47 |
| 2013/0331132 A1* | 12/2013 | Goliszewski | H04W 4/12 | 455/466 |
| 2014/0101296 A1* | 4/2014 | Li | G06Q 30/02 | 709/221 |
| 2014/0114899 A1* | 4/2014 | Wan | G06N 5/04 | 706/47 |
| 2014/0167958 A1* | 6/2014 | Kimchi | A01K 1/031 | 340/539.13 |
| 2014/0221866 A1* | 8/2014 | Quy | H04W 4/206 | 600/544 |
| 2014/0309269 A1* | 10/2014 | Price | A61K 31/4168 | 514/401 |

FOREIGN PATENT DOCUMENTS

| | | |
|---|---|---|
| JP | 2007-509432 A | 4/2007 |
| JP | A-2013-29928 | 2/2013 |
| JP | 2013-093718 A | 5/2013 |
| WO | 2005/045591 A2 | 5/2005 |

* cited by examiner

FIG.3

| USER ID | EMOTIONAL INFORMATION |
|---------|----------------------|
| USER #2 | ANGRY |
| USER #3 | RELAX |
| USER #4 | SAD |
| ⋮ | ⋮ |

FIG.5

| USER ID | EMOTIONAL SCORE |
|---|---|
| USER #1 | (5, 1), (5, 3) ⋯ |
| USER #2 | (5, -4), (4, -3) ⋯ |
| ⋮ | ⋮ |

FIG.8

| USER ID | FRIEND ID |
|---|---|
| USER #1 | USER #2 |
| | USER #3 |
| | USER #4 |
| | ⋮ |
| USER #2 | USER #1 |
| | USER #3 |
| | USER #4 |
| ⋮ | ⋮ | ated mail based on the calculated
INFORMATION PROCESSING DEVICE, CONTROL METHOD, AND A NON-TRANSITORY COMPUTER READABLE STORAGE MEDIUM

CROSS-REFERENCE TO RELATED APPLICATION

The present application claims priority to and incorporates by reference the entire contents of Japanese Patent Application No. 2013-177337 filed in Japan on Aug. 28, 2013.

BACKGROUND OF THE INVENTION

1. Field of the Invention

The present invention relates to an information processing device, a control method, and a recording medium.

2. Description of the Related Art

In the related art, a technique which determines a mental state or an emotion of a user based on the user's biological information obtained from the user and provides a service in accordance with the mental state and the emotion of the user has been known. As an example of such a technique, an information terminal device which detects the emotion of the user and processes a message in process of creation by the user in accordance with the detected emotion is known.

For example, when the user creates a message, the information terminal device measures the user's biological information using a biosensor and calculates information representing strength of the mental state or the emotion of the user using the measured biological information. The information terminal device processes a mail, which is created by the user, and transmits the processed mail based on the calculated information to deliver the emotion of the user.

Patent Document 1: Japanese Laid-open Patent Publication No. 2013-029928

However, in the related art, the emotion of the user is transmitted only to a destination of the message so that it is difficult to transmit the emotion of the user to a location other than the transmission destination. Therefore, in the related art, it is difficult to determine whether a timing to transmit a message is good after confirming the emotion of the user of the transmission destination in advance.

SUMMARY OF THE INVENTION

It is an object of the present invention to at least partially solve the problems in the conventional technology.

According to one aspect of an embodiment of the present invention, An information processing device includes a collecting unit which collects user's biological information. The information processing device includes a determining unit which determines an emotion of the user by using the biological information collected by the collecting unit. The information processing device includes an output unit which outputs in association with information representing the user and the emotion of the user determined by the determining unit to terminal devices which are used by other users.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating an example of an emotional information management table according to the exemplary embodiment;

FIG. 5 is a diagram illustrating an example of information stored in an emotional score management table according to the exemplary embodiment;

FIG. 8 is a diagram illustrating an example of information stored in a friend management table according to the exemplary embodiment;

DETAILED DESCRIPTION OF THE PREFERRED EMBODIMENTS

Figure 1:
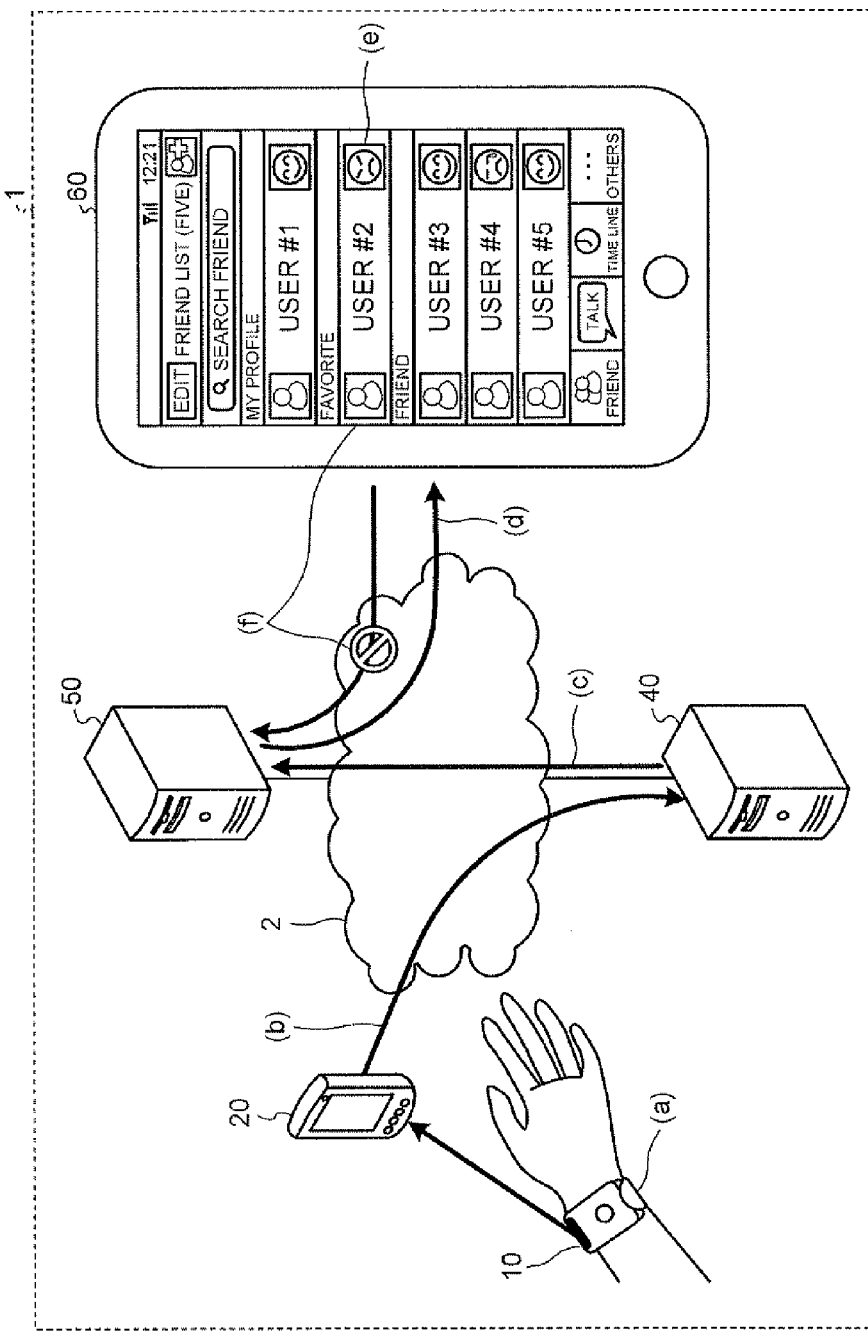
FIG. 1 is a diagram illustrating an example of a function demonstrated by an information providing system according to an exemplary embodiment.

Hereinafter, a mode for carrying out an information processing device, a control method, and a recording medium according to the exemplary embodiment will be described in detail with reference to the drawings. Further, the information processing device, the control method, and the recording medium according to the exemplary embodiment are not limited to the exemplary embodiment. In the exemplary embodiments, like component is denoted by like reference numeral and redundant description will not be provided.

1. Information Providing System

First, an example of a process which is performed by an information providing system including an emotion determining server which is an example of an information processing device of the exemplary embodiment will be described with reference to FIG. 1. FIG. 1 is a diagram illustrating an example of a function demonstrated by an information providing system according to an exemplary embodiment. As illustrated in FIG. 1, an information providing system 1 has a configuration in which a biological information acquiring device 10, terminal devices 20 and 60, an emotion determining server 40, a social network server 50 are connected through a network 2.

Further, it is assumed that in the information providing system 1, a plurality of terminal devices are further included. Further, the terminal devices 20 and 60 are used by different users. In the following description, an example in which the terminal device 60 is used by a user #1 and the terminal device 20 is used by a user #2 will be described.

The biological information acquiring device 10 is a wearable device which acquires biological information of a user. For example, the biological information acquiring device 10 is mounted in a wrist of the user #2 and acquires various biosensor values, such as a heart rate, a pulse, a body temperature, a myoelectric change, an electro-dermal activity (EDA), a voice, a walking distance, and a walking time, from the user. The biological information acquiring device 10 outputs the acquired various biosensor values to the terminal device 20 using near field wireless communication such as Bluetooth (registered trademark) or a wireless local area network (LAN).

The terminal device 20 is a terminal device of a user to whom the biological information acquiring device 10 is mounted and is an information processing device such as a smart phone, a tablet terminal, a personal digital assistant (PDA), or a notebook personal computer (PC). Further, when the biosensor values of the user #2 are received from the biological information acquiring device 10, the terminal device 20 displays the received biosensor values to encourage the user #2 to whom the biological information acquiring device 10 is mounted to manage a health condition or the like.

Further, the terminal device 20 may transmit and receive a message to and from the terminal device 60 which is used by another user by a function provided by the social network server 50. For example, the terminal device 60 inquires of the social network server 50 to acquire a friend list of the user #1 who is a user of the terminal device 60. The terminal device 60 displays the acquired friend list screen.

Thereafter, when the user #1 selects a destination of a message from the friend list screen and inputs a content of the message, the terminal device 60 transmits a message added with a user ID (identification) indicating the user #1 and a user ID indicating a user who is the transmission destination to the social network server 50. Further, when the message is transmitted and received, the terminal device 60 generates a thread for every combination of users who transmit and receive the message and displays transmitted and received messages on the generated thread being arranged in the transmitting and receiving order in parallel.

The social network server 50 manages friends of each user and outputs the friend list corresponding to the user to the terminal devices 20 and 60 in accordance with a request from the terminal devices 20 and 60. Further, when the message is received, the social network server 50 extracts the user ID of the transmission destination from the received message and transmits the received message to the terminal device of a user who is identified by the extracted user ID. For example, when a message which is transmitted from the user #1 to the user #2 is received, the social network server 50 transmits the received message to the terminal device 20 of the user #2.

Further, the social network server 50 may have a function as a microblog which opens the message in the format of a message board to the public or a function which opens data such as a text or a picture which is posted by the user to other users in addition to relay of a message transmitted and received between the users. In other words, the social network server 50 may be a server which provides an arbitrary social networking service (SNS) which transmits and receives a message or data between arbitrary users.

Further, a specific example of the SNS includes Kakao Talk (registered trademark) or Yahoo! Blog (registered trademark), Twitter (registered trademark), pixiv (registered trademark), Facebook (registered trademark), or Myspace (registered trademark). Further, hereinafter, an example that the social network server 50 relays a message to be transmitted and received between the users will be described.

Here, when the user #2 who is a user of the terminal device 20 is in a bad mood and does not want to receive the message from other people, a situation when the user #1 who is a user of the terminal device 60 wants to determine whether to contact with the user #2, for example, to transmit the message in accordance with the mood of the user #2 is considered. However, in the related art, when the message is not transmitted, it is difficult to notify the emotion to the transmission destination so that it is difficult to determine whether to contact with a friend in accordance with the emotion of the friend.

The information providing system 1 has an emotion determining server 40 which uses a biosensor value obtained from the user to specify emotion of the user and notify the specified emotion to other users. Hereinafter, an example of a process which is performed by the emotion determining server 40 will be described.

First, as illustrated in (a) of FIG. 1, the biological information acquiring device 10 regularly acquires the biosensor value from the user #2 and transmits the acquired biosensor value to the terminal device 20. In this case, the terminal device 20 generates awakening degree or a pleasant degree of the user from the received biosensor value. The terminal device 20 treats a pair of the generated awakening degree and the pleasant degree as an emotional score and transmits the emotional score to the emotion determining server 40 through a network 2, as illustrated in (b) of FIG. 1.

In the meantime, the emotion determining server 40 uses the emotional score received from the terminal device 20 to specify the emotion of the user #2. For example, the emotion determining server 40 uses the awakening degree or the pleasant degree of the emotional score to specify one of "excited state", "delight state", "relaxed state", "bored state", "depressed state", "sad state", "panic state" and "angry state" as the emotion of the user.

The emotion determining server 40, as illustrated in (c) of FIG. 1, transmits emotional information representing a specified emotion to the social network server 50. In other words, the emotion determining server 40 notifies the emotion of the user #2 to the social network server 50 in order to display the emotion of the user #2 in the terminal device of a friend of the user #2.

In this case, as illustrated in (d) of FIG. 1, the social network server 50 specifies the terminal device of the user who includes the user #2 in the friend list and instructs the specified terminal device to display information representing the emotion of the user #2. For example, the social network server 50 instructs the terminal device 60 of the user #1 who includes the user #2 in the friend list to display an icon representing that the emotion of the user #2 is a predetermined emotion (for example, "angry state"). As a result, as illustrated in (e) of FIG. 1, the terminal device 60 displays an icon representing the emotion of the user #2.

Further, the terminal device 60 may display icons representing respective emotions specified by the emotion determining server 40 in accordance with a notice from the social network server 50. As a result, for example, when the emotion of the user #2 is a predetermined emotion, the user #1 may determine whether to contact with the user #2 in accordance with the emotion of the destination of the message, for example, by declining to transmit the message.

Further, as illustrated in (f) of FIG. 1, when a user having a predetermined emotion (for example, "angry state") is selected as the destination of the message, the terminal device 60 displays that the transmission of the message is restricted and does not transmit the message. That is, the terminal device 60 controls the transmission of the message in accordance with the emotion of the user who is the destination of the message. Accordingly, the terminal device 60 may prevent the user from erroneously transmitting the message to a user who is in a bad mood.

Further, in the above-described example, although the emotion determining server 40 transmits the emotional information to the social network server 50, the emotion determining server 40 may discriminate a terminal device which is used by a friend of each user and directly transmit instruction to display the emotion of the user to the terminal device of the discriminated friend. In other words, the information providing system 1 may be configured to demonstrate the functions demonstrated by the emotion determining server 40 and the social network server 50 using one information processing device.

The terminal devices 20 and 60 may display the emotions of the friends not on a screen which selects a point of contact but on a list screen of connected friends. Further, the terminal devices 20 and 60 may display the emotions of the friends as a form of alert. That is, if the terminal devices 20 and 60 can display the emotions of other users, the terminal devices 20 and 60 may display the emotion in an arbitrary display format.

Further, the social network server 50 may determine whether to open data such as a text or a picture which is sent to the friend by the user in accordance with the emotion of the user, similarly to the terminal devices 20 and 60. For example, when data such as the text or the picture posted by the user is open to the friend, if the emotion of the user is a predetermined emotion (for example, "angry state"), the social network server 50 may restrict opening the data.

In the following description, it is assumed that the social network server 50 relays the message between the users. Further, in the following description, when the emotion of the user who is the destination of the message is "angry state", the terminal devices 20 and 60 restrict the transmission of the message.

2. Functional Configuration of Terminal Device

Figure 2:
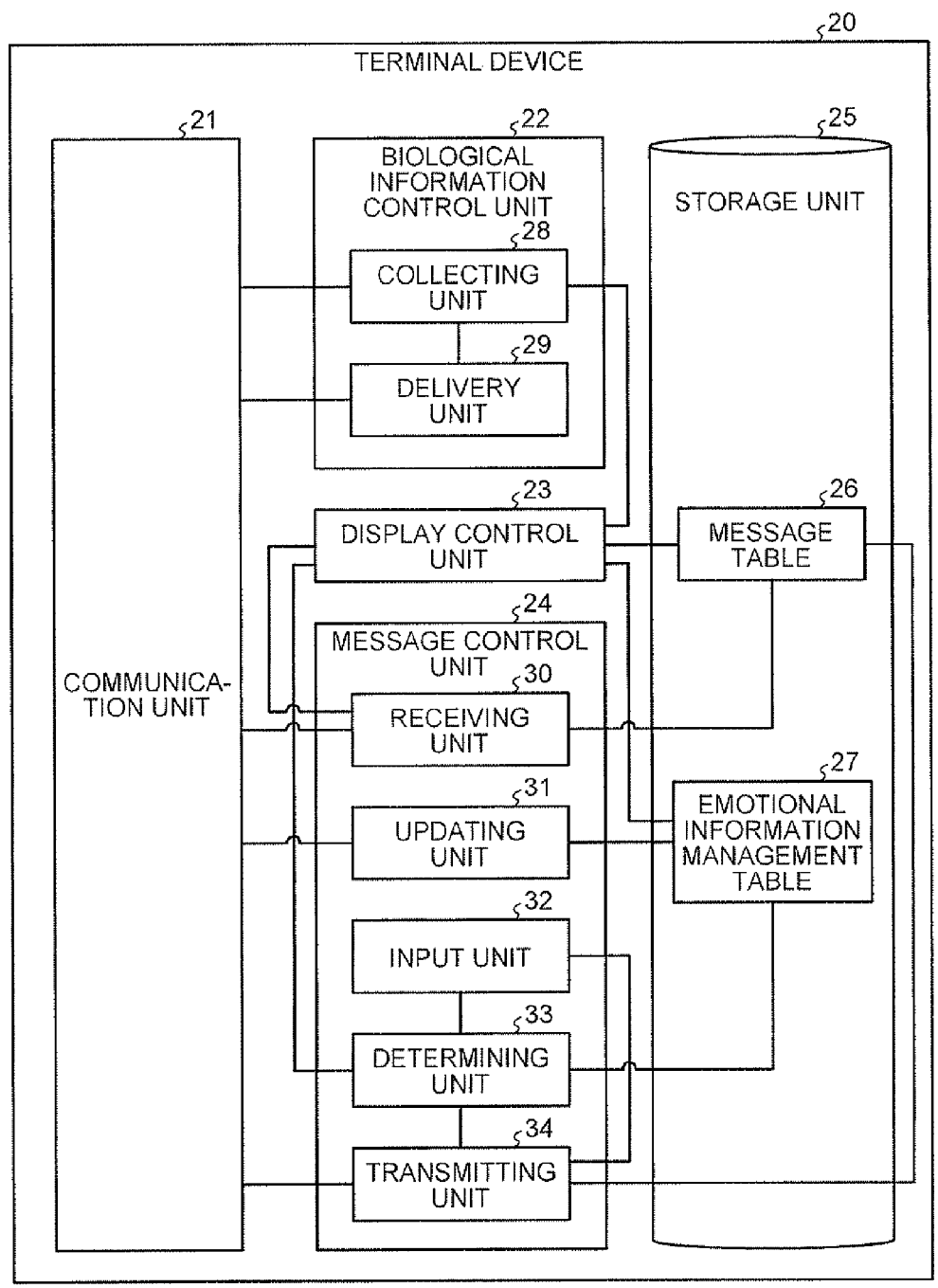
FIG. 2 is a diagram illustrating an example of a functional configuration of a terminal device according to the exemplary embodiment.

Next, a functional configuration of the terminal device 20 according to the exemplary embodiment will be described with reference to FIG. 2. FIG. 2 is a diagram illustrating an example of a functional configuration of the terminal device according to the exemplary embodiment. In the example illustrated in FIG. 2, the terminal device 20 includes a communication unit 21, a biological information control unit 22, a display control unit 23, a message control unit 24, and a storage unit 25. Further, the biological information control unit 22 includes a collecting unit 28, and a delivery unit 29. Furthermore, the message control unit 24 includes a receiving unit 30, an updating unit 31, an input unit 32, a determining unit 33, and a transmitting unit 34. Further, the storage unit 25 stores a message table 26 and an emotional information management table 27.

First, the message table 26 and the emotional information management table 27 which are stored by the storage unit 25 will be described. The message table 26 is a table in which message transmitted and received by the terminal device 20 is stored. For example, in the message table 26, the messages which are transmitted and received by the user #1 or the user #2 are stored in a time series.

The emotional information management table 27 stores emotional information representing emotion of each user. For example, FIG. 3 is a diagram illustrating an example of an emotional information management table according to the exemplary embodiment. As illustrated in FIG. 3, a user ID and the emotional information are stored in the emotional information management table 27 in association with each other.

For example, in an example illustrated in FIG. 3, in the emotional information management table 27, a user ID "user #2" of the user #2 and the emotional information "angry state" are stored in associated with each other and a user ID "user #3" and the emotional information "relaxed state" are stored in associated with each other. Further, in the emotional information management table 27, a user ID "user #4" and the emotional information "sad state" are stored in associated with each other.

Referring to FIG. 2 again, description will be continued. The communication unit 21 controls communication between the biological information acquiring device 10, the emotion determining server 40, and the social network server 50. Specifically, when a biosensor value acquisition request is received from the collecting unit 28, the communication unit 21 transmits the biosensor value acquisition request to the biological information acquiring device 10 through a near field wireless communication. When the biosensor value is received from the biological information acquiring device 10, the communication unit 21 outputs the received biosensor value to the collecting unit 28. Further, when an emotional score notice including the emotional score and the user ID indicating a user who is an acquisition source of the emotional score is received from the delivery unit 29, the communication unit 21 transmits the received emotional score notice to the emotion determining server 40 through the network 2.

Further, when a message is received from the social network server 50, the communication unit 21 outputs the received message to the receiving unit 30. Furthermore, when emotional information notice including emotional information representing emotions of other users and a user ID of the user is received from the social network server 50, the communication unit 21 outputs the received emotional information notice to the updating unit 31. When a message is received from the transmitting unit 34, the communication unit 21 outputs the received message to the social network server 50.

Next, functions of the collecting unit 28 and the delivery unit 29 included in the biological information control unit 22 will be described. The collecting unit 28 acquires the biosensor value of the user #1 at a predetermined time interval. For example, the collecting unit 28 generates the biosensor value acquisition request at a predetermined time interval or in accordance with the request from the user #1 and outputs the biosensor value acquisition request to the communication unit 21. As a result, the collecting unit 28 receives the biosensor value acquired by the biological information acquiring device 10 through the communication unit 21.

The collecting unit 28 generates an emotional score which is a set of awakening degree of the user and the pleasant degree of the user from the received biosensor value. For example, the collecting unit 28 generates a numerical value obtained by evaluating the awakening degree or the pleasant degree at 10 levels of −5 to 5. The collecting unit 28 outputs the generated set of the numerical values to the display control unit 23 and the delivery unit 29 as the emotional score.

The delivery unit 29 transmits the emotional score to the emotion determining server 40. Specifically, when the emotional score is received from the collecting unit 28, the delivery unit 29 generates an emotional score notice including the user ID of the user who is an acquisition source of the received emotional score and the received emotional score and outputs the generated emotional score notice to the communication unit 21. Further, the delivery unit 29 caches the emotional score received from the collecting unit 28 in the storage unit 25 and outputs the cached emotional scores to the emotion determining server 40 when a predetermined quantity of the emotional scores are cached.

The display control unit 23 controls a display device which is included in the terminal device 20. For example, when the emotional score is received from the collecting unit 28, the display control unit 23 displays the received emotional score on screen of the terminal device 20 which has not been illustrated. Further, contents which are displayed on the screen of the terminal device 20 by the display control unit 23 may vary depending on the contents of a program set by the user #2. For example, the display control unit 23 may create a screen showing a life rhythm or an exercising amount of the user from arbitrary biological information including the biosensor value or the emotional score and display the created screen.

Further, the display control unit 23 displays a message which is transmitted and received by the terminal device 20. For example, when it is requested to display a message from the receiving unit 30, the display control unit 23 reads the message from the message table 26. Further, the display control unit 23 reads a message related with the read message, for example, the message transmitted and received by the same user and displays the read message in the transmitting or receiving order in the screen which has not been illustrated.

Further, when a screen which selects the destination of the message is displayed by the manipulation of the user, the display control unit 23 performs following processes. First, the display control unit 23 acquires the emotional information representing the emotion of the user from the emotional information management table 27. The display control unit 23 displays an icon representing the emotion of each user on the screen which selects the destination of the message based on the acquired emotional information to notify the emotion of the user who is the destination of the message. For example, when the user ID "user #2" of the user #2 is stored in the emotional information management table 27 in associated with the "angry state", the display control unit 23 displays an icon representing "angry state" next to a name of the user #2.

Further, when the determining unit 33 requests the display control unit 23 to display a notice indicating that the transmission of the message is restricted, the display control unit 23 displays the notice indicating that the transmission of the message is restricted on the screen.

Next, functions of the receiving unit 30, the updating unit 31, the input unit 32, the determining unit 33, and the transmitting unit 34 included in the message control unit 24 will be described. When a message sent to the user #1 is received, the receiving unit 30 stores the received message in the message table 26. The receiving unit 30 requests the display control unit 23 to display the received message.

The updating unit 31 updates the information stored in the emotional information management table 27.
Specifically, when the emotional information notice is received from the communication unit 21, the updating unit 31 extracts the user ID and the emotional information from the received emotional information notice. The updating unit 31 updates emotional information which is associated with the extracted user ID among the emotional information stored in the emotional information management table 27 to the extracted emotional information.

The input unit 32 acquires contents manipulated by the user. Specifically, the input unit 32 outputs a user ID indicating a user selected by the user to the determining unit 33 on a screen which selects a user who is a point of contact. When the instruction to transmit the message is received from the determining unit 33, the input unit 32 accepts the input of the message by the user and outputs the accepted message to the transmitting unit 34. In contrast, when the instruction to transmit the message is not received from the determining unit 33, the input unit 32 ends the process without accepting the input of the message.

The determining unit 33 determines whether to transmit the message to the user in accordance with the emotion of the user who is the destination of the message. Specifically, the determining unit 33 receives the user ID of the user who is the destination of the message from the input unit 32. In this case, the determining unit 33 acquires the emotional information which is associated with the received user ID from the emotional information management table 27. The determining unit 33 determines whether the acquired emotional information is "angry state".

Here, if the determining unit 33 determines that the acquired emotional information is the "angry state", the determining unit 33 requests the display control unit 23 to display the notice indicating that the transmission of the message is restricted and ends the process without outputting instruction to transmit the message to the determining unit 33. In contrast, if it is not determined that the acquired emotional information is the "angry state", the determining unit 33 outputs an instruction to transmit the message to the input unit 32.

The transmitting unit 34 transmits a message. Specifically, when the message is received from the input unit 32, the transmitting unit 34 adds a user ID of a user who is the transmission source of the message and a user ID of a user who is the destination of the message to the message. The transmitting unit 34 requests to output the message to the communication unit 21 and to transmit the message to the social network server 50. Further, the transmitting unit 34 stores the transmitted message in the message table 26.

3. Functional Configuration of Emotion Determining Server

Figure 4:
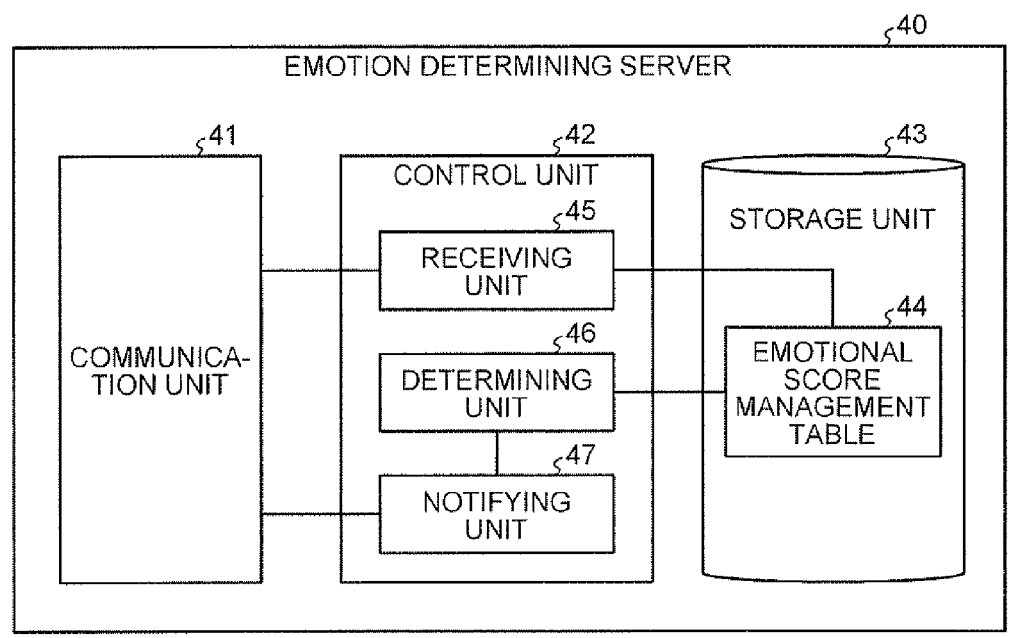
FIG. 4 is a diagram illustrating an example of a functional configuration of an emotion determining server according to the exemplary embodiment.

Next, a functional configuration of the emotion determining server 40 according to the exemplary embodiment will be described with reference to FIG. 4. FIG. 4 is a diagram illustrating an example of a functional configuration of the emotion determining server according to the exemplary embodiment. In an example illustrated in FIG. 4, the emotion determining server 40 includes a communication unit 41, a control unit 42, and a storage unit 43. Further, the storage unit 43 stores an emotional score management table 44. Furthermore, the control unit 42 includes a receiving unit 45, a determining unit 46, and a notifying unit 47.

First, the emotional score management table 44 which is stored by the storage unit 13 will be described with reference to FIG. 5. FIG. 5 is a diagram illustrating an example of information stored in the emotional score management table according to the exemplary embodiment. As illustrated in FIG. 5, in the emotional score management table 44, an emotional score which is acquired from a user identified by a user ID in associated with the user ID is stored in time series in a format of (awakening degree, a pleasant degree).

For example, in the example illustrated in FIG. 5, in the emotional score management table 44, emotions scores (5,1) and (5,3) which are acquired in time series in associated with the user ID "user #1" are stored. Further, in the example illustrated in FIG. 5, in the emotional score management table 44, emotions scores (5,−4) and (4,−3) which are acquired in time series in associated with the user ID "user #2" are stored.

Referring to FIG. 4 again, description will be continued. The communication unit 41 controls the communication between the emotion determining server 40, the terminal devices 20 and 60, and the social network server 50. Specifically, when the emotional score notice is received from the terminal devices 20 and 60 through the network 2, the communication unit 41 outputs the received emotional score notice to the receiving unit 45. Further, when the emotional information notice representing the emotion of the user is received from the notifying unit 47, the communication unit 41 transmits the received emotional information notice to the social network server 50 through the network 2.

The receiving unit 45 receives the emotional score acquired from the user. Specifically, when the emotional score notice is received from the communication unit 41, the receiving unit 45 extracts the user ID and the emotional score from the received emotional score notice. The receiving unit 45 stores the emotional score in the emotional score management table 44 in associated with the extracted user ID.

The determining unit 46 uses the emotional score obtained from the user to determine the emotion of the user. For example, the determining unit 46 reads the latest awakening degree and pleasant degree among the awakening degree and the pleasant degree which are the emotional score of the user who is an object to be determined at a predetermined time interval from the emotional score management table 44 and determines the emotion of the user based on the read awakening degree and pleasant degree. The determining unit 46 outputs emotional information representing the determined emotion of the user and the user ID of the user to the notifying unit 47.

Figure 6:
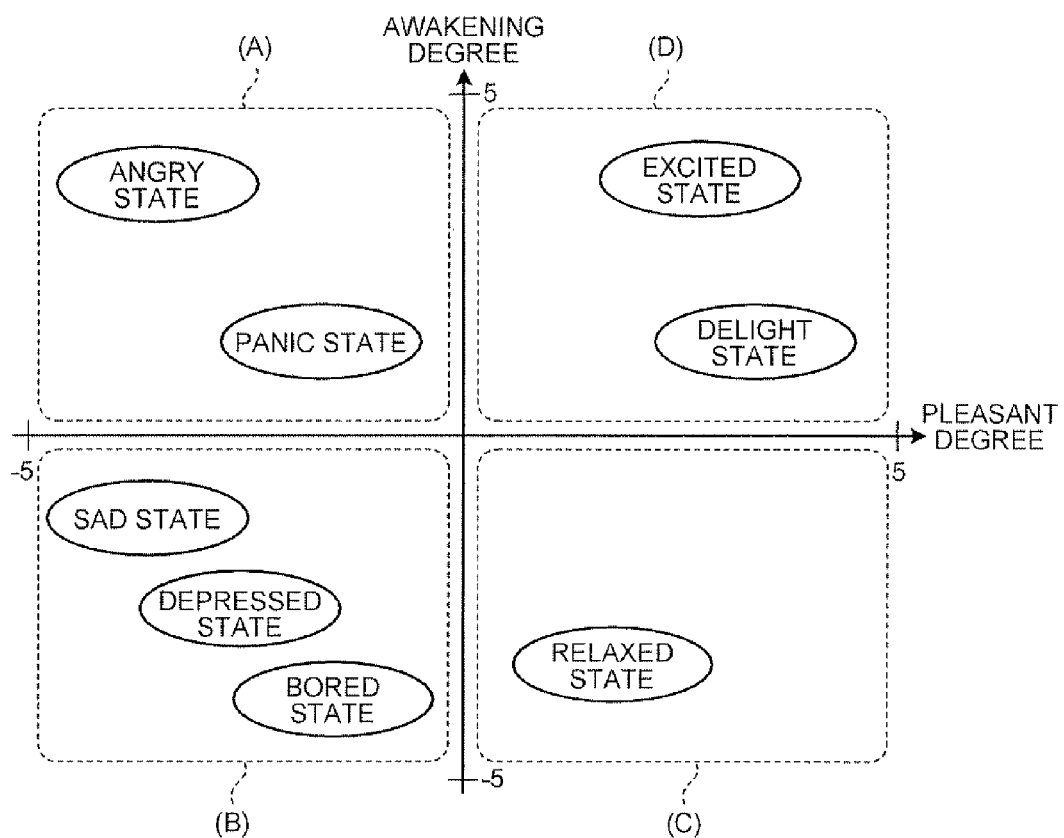
FIG. 6 is a diagram illustrating an example of a process in which an emotion determining server according to the exemplary embodiment determines emotion of the user.

Here, referring to FIG. 6, an example of a process of determining the emotion of the user by the determining unit 46 will be described. FIG. 6 is a diagram illustrating an example of a process in which an emotion determining server according to the exemplary embodiment determines the emotion of the user. In FIG. 6, an example of a two-dimensional emotion model which is used to determine the emotion from the awakening degree and the pleasant degree of the user is illustrated.

For example, when the awakening degree of the user has a positive value and the pleasant degree has a negative value, the determining unit 46, as illustrated in (A) of FIG. 6, determines that the emotion of the user is in an "ultra negative status", such as the "angry state" or the "panic state". Specifically, the awakening degree of the user is approximately "3" and a value of the pleasant degree is approximately in a range of "−5 to −2", the determining unit 46 determines that the emotion of the user is "angry state" and the awakening degree of the user is approximately in a range of "1 to 3" and a value of the pleasant degree is approximately in a range of "−3 to 0", the determining unit 46 determines that the emotion of the user is "panic state".

Further, as illustrated in (B) of FIG. 6, when the awakening degree of the user has a negative value and the pleasant degree has a negative value, the determining unit 46 determines that the emotion of the user is in a "negative status" such as "sad state", "depressed state" or "bored state". Specifically, when the awakening degree of the user is approximately in a range of "−1 to 0" and a value of the pleasant degree is approximately in a range of "−5 to −2", the determining unit 46 determines that the emotion of the user is "sad state". When the awakening degree of the user is approximately in a range of "−3 to −1" and a value of the pleasant degree is approximately in a range of "−3 to −1", the determining unit 46 determines that the emotion of the user is "depressed state", and when the awakening degree of the user is approximately in a range of "−5 to −3" and a value of the pleasant degree is approximately in a range of "−3 to 0", the determining unit 46 determines that the emotion of the user is "bored state".

Further, as illustrated in (C) of FIG. 6, when the awakening degree of the user has a negative value and the pleasant degree has a positive value, the determining unit 46 determines that the emotion of the user is in a "positive state" such as "relaxed state". Specifically, when the awakening degree of the user is approximately in a range of "−4 to −3" and a value of the pleasant degree is approximately in a range of "0 to 3", the determining unit 46 determines that the emotion of the user is "relaxed state".

Further, as illustrated in (D) of FIG. 6, when the awakening degree of the user has a positive value and the pleasant degree has a positive value, the determining unit 46 determines that the emotion of the user is in an "ultra positive status" such as "excited state" or "delight state". Specifically, when the awakening degree of the user is approximately in a range of "3 to 5" and a value of the pleasant degree is approximately in a range of "3 to 4",the determining unit 46 determines that the emotion of the user is "excited state". When the awakening degree of the user is approximately in a range of "0 to 2" and a value of the pleasant degree is approximately in a range of "2 to 5", the determining unit 46 determines that the emotion of the user is "delight state".

Here, an example of a process which is performed by the determining unit 46 will be described. For example, the determining unit 46 obtains a set (5, −4) of the awakening degree and the pleasant degree which is associated with the user ID "user #2" of the user #2 from the emotional score management table 44 illustrated in FIG. 5. The determining unit 46 determines that the emotion of the user #2 is "angry state" from the obtained set "(5,−4)" of the awakening degree and the pleasant degree. Thereafter, the determining unit 46 notifies the emotional information representing the "angry state" and the user ID "user #2" of the user #2 to the notifying unit 47.

The two-dimensional emotion model illustrated in FIG. 6 is only an example and the emotion determining server 40 may use an arbitrary emotion model to determine the emotion of the user. For example, the determining unit 46 may use a plurality of sets of the awakening degree and the pleasant degree to determine the emotion of the user from a temporal transition of the awakening degree and the pleasant degree.

Referring to FIG. 4 again, description will be continued. The notifying unit 47 notifies the emotion of the user to the social network server 50. Specifically, the notifying unit 47 receives the user ID and the emotional information representing the emotion of the user which is identified by the user ID from the determining unit 46. The notifying unit 47 generates the emotional information notice including the emotional information representing the emotion of the user and the user ID and outputs the generated emotional information notice to the communication unit 41.

4. Functional Configuration of Social Network Server

Figure 7:
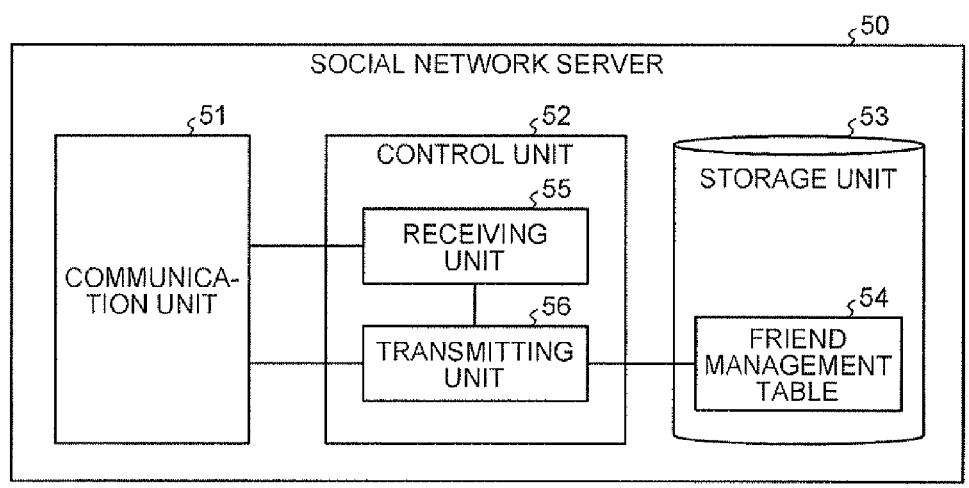
FIG. 7 is a diagram illustrating an example of a functional configuration of a social network server according to the exemplary embodiment.

Next, a functional configuration of the social network server 50 according to the exemplary embodiment will be described with reference to FIG. 7. FIG. 7 is a diagram illustrating an example of a functional configuration of the social network server according to the exemplary embodiment. In an example illustrated in FIG. 7, the social network server 50 includes a communication unit 51, a control unit 52, and a storage unit 53. Further, the storage unit 53 stores a friend management table 54. Further, the control unit 52 includes a receiving unit 55 and a transmitting unit 56.

First, an example of information stored in the friend management table 54 which is stored in the storage unit 53 will be described. The friend management table 54 is a table that manages a user who is the other user who transmits and receives the message to and from the user, that is, a user ID of a friend. For example, FIG. 8 is a diagram illustrating an example of information stored in the friend management table according to the exemplary embodiment. As illustrated in FIG. 8, in the friend management table 54, the user ID and a user ID indicating a friend, that is, a friend ID are stored in associated with each other.

For example, in the example illustrated in FIG. 8, in the friend management table 54, "user #2", "user #3", and "user #4" are stored as a user ID indicating the friend of the user #1. Further, in the friend management table 54, "user #1", "user #3", and "user #4" are stored as a user ID indicating a friend of the user #2.

Referring to FIG. 7, description is continued. The communication unit 51 controls the communication between the social network server 50, the terminal devices 20 and 60, and the emotion determining server 40. For example, when the message is received from the terminal devices 20 and 60 through the network 2, the communication unit 51 outputs the received message to the receiving unit 55. Further, when the message is received from the transmitting unit 56, the communication unit 51 transmits the received message to the terminal devices 20 and 60.

Further, when the emotional information notice is received from the emotion determining server 40, the communication unit 51 outputs the received emotional information notice to the receiving unit 55. Further, when the user ID of the user who is the transmission destination is received from the transmitting unit 56 together with the emotional information notice, the communication unit 51 transmits the received emotional information notice to the terminal device of the user identified by the received user ID.

When the message transmitted by the terminal devices 20 and 60 is received, the receiving unit 55 outputs the received message to the transmitting unit 56. Further, when the emotional information notice is received, the receiving unit 55 extracts the emotional information and the user ID from the received emotional information notice and outputs the extracted emotional information and user ID to the transmitting unit 56.

When the message is received from the receiving unit 55, the transmitting unit 56 outputs the received message to the communication unit 51 and transmits the message to the terminal device of the user who is the transmission destination. Further, when the emotional information and the user ID are received, the transmitting unit 56 acquires the user ID of a friend which is associated with the received user ID from the friend management table 54. The transmitting unit 56 creates the emotional information notice including the received emotional information and user ID and requests the communication unit 51 to transmit the created emotional information notice to the user ID which is acquired from the friend management table 54.

5. Displaying Example in Terminal Device

Figure 9:
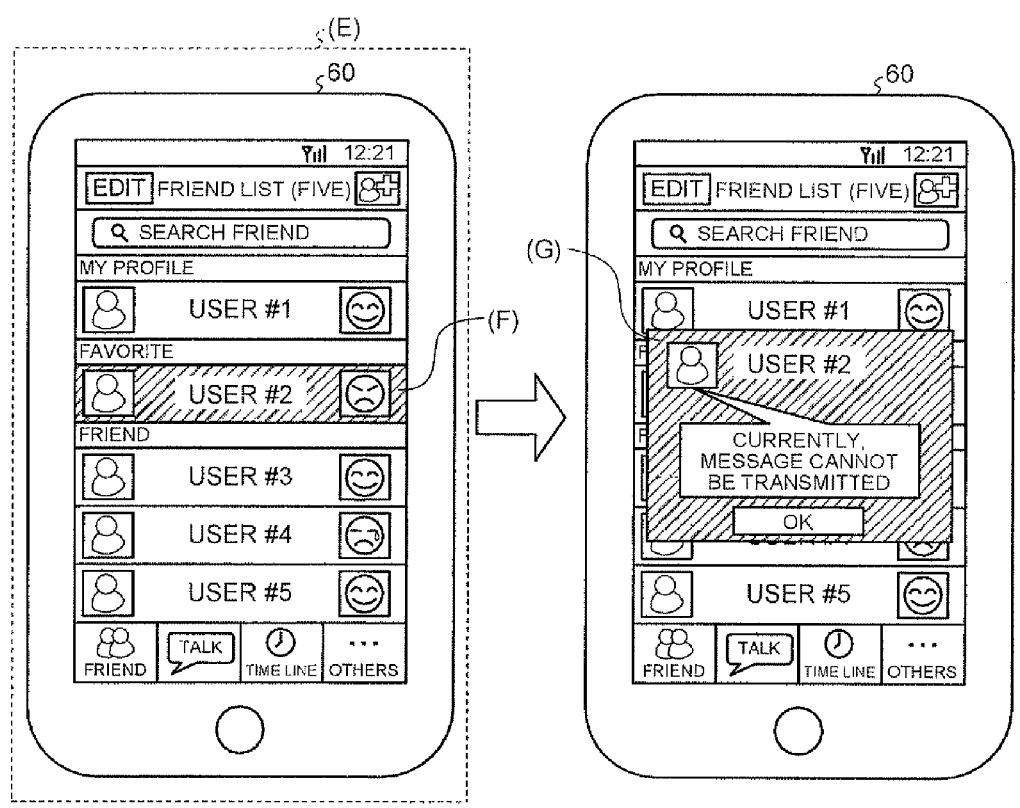
FIG. 9 is a diagram illustrating an example of information displayed by a terminal device according to the exemplary embodiment.

Next, an example of information which is displayed by the terminal device 60 will be described with reference to FIG. 9. FIG. 9 is a diagram illustrating an example of information displayed by a terminal device according to the exemplary embodiment. For example, the terminal device 60 displays the friend list as a screen which selects a user who is the destination of the message by the manipulation of the user, as illustrated in (E) of FIG. 9. In this case, the terminal device 60 displays not only the name of each friend, but also an icon representing the emotion of each user. For example, as illustrated in (F) of FIG. 9, the terminal device 60 displays an icon indicating that the emotion of the user #2 is "angry state".

Further, the terminal device 60 displays that the emotion of the user #3 is "relaxed state", the emotion of the user #4 is "sad state", and the emotion of the user #5 is "relaxed state". Therefore, the terminal device 60 may determine whether to contact with the user who is the destination of the message in accordance with the emotion of the user. Further, the terminal device 60 also displays the icon indicating the emotion "relaxed state" of the user #1, that is, the user of the terminal device 60. Therefore, the terminal device 60 may easily identify the emotion of the user himself/herself which is open to the other people.

Here, when the user of the terminal device 60 selects the user #2, as illustrated in (G) of FIG. 9, the terminal device 60 displays a notice indicating that the message cannot be transmitted to the user #2 and does not transmit the message. As a result, the terminal device 60 may restrict the transmission of the message to a user who is in bad mood.

When it is possible to display the emotions of other users, the terminal device 60 may display the emotion in the different format. For example, the terminal device 60 may display the icons indicating the respective friends in a position in accordance with the emotions of the friends, on a predetermined axis or a predetermined plane.

Figure 10:
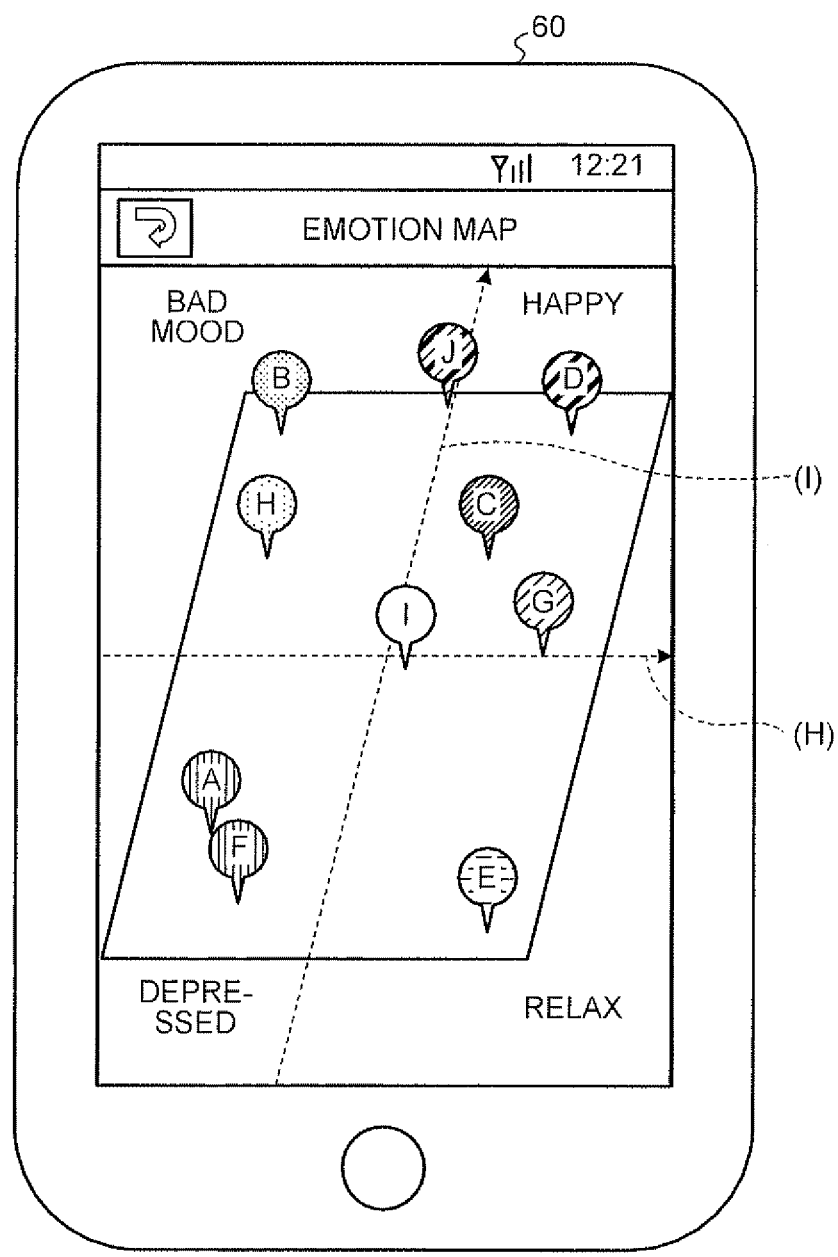
FIG. 10 is a diagram illustrating another example of information displayed by a terminal device according to the exemplary embodiment.

For example, FIG. 10 is a diagram illustrating another example of information displayed by the terminal device according to the exemplary embodiment. Referring to FIG. 10, an example that displays icons representing users A to J who are friends of the user #1 is described. Further, in the example illustrated in FIG. 10, an emotion which is the "ultra negative state" is described as "feel bad", an emotion which is the "negative state" is described as "depressed", an emotion which is the "positive state" is described as "relax" and an emotion which is the "ultra positive state" is described as "happy".

For example, the terminal device 60 displays the icons representing the friends on two-dimensional "awakening degree and pleasant degrees" plane having a horizontal axis direction as the pleasant degree as illustrated in (H) of FIG. 10, and a vertical axis direction as the awakening degree as illustrated in (I) of FIG. 10. Specifically, the terminal device 60 displays an icon to which a color or a shape is added in accordance with the emotional score of the user in a position indicating the emotional score of the user.

For example, in the example illustrated in FIG. 10, the terminal device 60 displays the icons representing the users A to J as the friends of the user #1 who uses the terminal device 60 on the "pleasant degree-awakening degree" axial plane and displays the icon such that a leading edge of a protruding portion of the icon indicates a position of the coordinate corresponding to the emotional score of the user. When the detailed example is described, the terminal device 60 arranges icons representing users B and H in an area which indicates the emotion "feel bad" and adds the color or shape to the icons in accordance with the emotional score of the users B and H. In the example illustrated in FIG. 10, since the emotional score of the user B is a value representing an emotion which is more negative than the emotional score of the user H, the terminal device 60 colors the icon representing the user B to be darker than the icon representing the user H.

Further, the terminal device 60 arranges icons representing users A and F in an area which indicates the emotion "depressed" and adds the color or shape to the icons in accordance with the emotional scores of the users A and. F. The terminal device 60 arrange an icon representing a user F in an area which indicates the emotion "relax" and adds the color or shape to the icon in accordance with the emotional score of the user E. Further, the terminal device 60 arranges icons representing users C and D in an area which indicates the emotion "happy" and adds the color or shape to the icons in accordance with the emotional scores of the users C and D.

Further, the terminal device 60 arranges an icon representing a user G near a boundary of an area indicating the emotion "relax" and an area indicating the emotion "happy" and adds the color or the shape to the icons in accordance with the emotional score of the user G. Further, the terminal device 60 arranges an icon representing a user J near a boundary of an area indicating the emotion "feel bad" and an area indicating the emotion "happy" and adds the color or the shape to the icons in accordance with the emotional score of the user J. Further, the terminal device 60 arranges an icon representing a user I near a boundary of the respective areas and adds the color or the shape to the icons in accordance with the emotional score of the user I. In the example illustrated in FIG. 10, the icon of the user I is colored with white without having a shape so as to indicate that there is no emotion.

As described above, the terminal device 60 displays the icons of the friends so as to have the color or the shape in a position in accordance with the emotions of the friends. Therefore, the terminal device 60 displays icons representing friends having similar emotions to be close to each other and displays icons representing friends having different emotions to be separated from each other. Accordingly, it is possible to discriminate the emotions of the friends. For example, the terminal device 60 can easily discriminate a friend having an emotion "happy".

Further, in the above-described example, although the icons of the friends are displayed on the two-dimensional "pleasant degree-awakening degree" axis plane where the horizontal direction is the pleasant degree and the vertical direction is the awakening degree, the exemplary embodiment is not limited thereto. For example, the terminal device 60 may display the icons in the position corresponding to the emotions of the friends on one-dimensional axis indicating the emotion from the "ultra negative" to the "ultra positive". That is, if the terminal device 60 displays the icons representing the friends in a position in accordance with the emotions of the friends on a screen indicating the emotions of the friends, an arbitrary display method may be applied.

6. Flow of Process Performed by Emotion Determining Server

Figure 11:
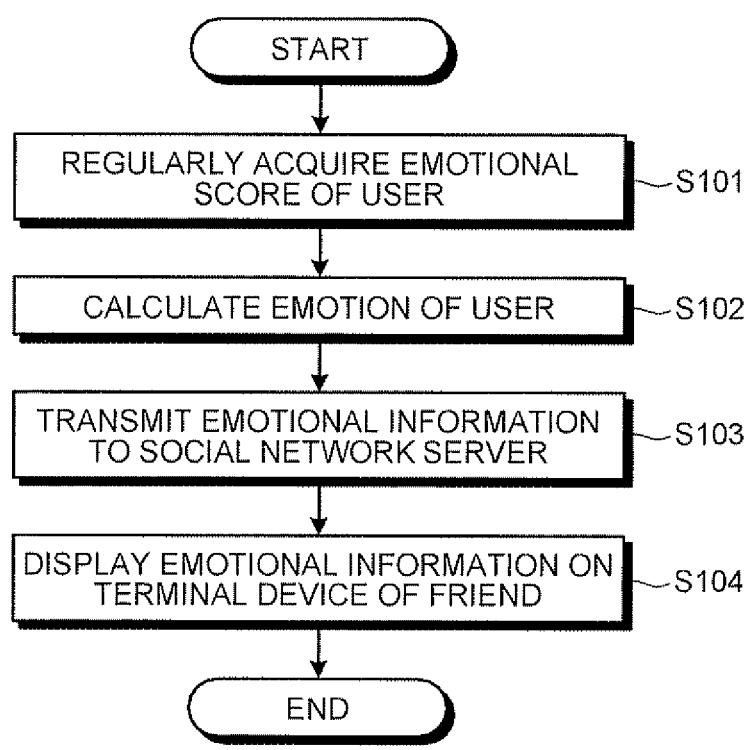
FIG. 11 is a flowchart illustrating a flow of a process which is performed by the emotion determining server according to the exemplary embodiment.

Next, a flow of a process which is performed by the emotion determining server 40 will be described with reference to FIG. 11. FIG. 11 is a flowchart illustrating a flow of a process which is performed by the emotion determining server according to the exemplary embodiment. As illustrated in FIG. 11, first, in step S101, the emotion determining server 40 receives the emotional score of the user. Next, in step S102, the emotion determining server 40 calculates the emotion of the user using the acquired emotional score.

Next, in step S103, the emotion determining server 40 transmits emotional information representing the calculated emotion and the user ID of the user to the social network server 50. As a result, in step S104, the social network server 50 transmits the emotional information to the terminal device which is used by a friend of the user identified by the received user ID and displays the user's emotional information on the terminal device. Thereafter, the emotion determining server 40 ends the process.

7. Flow of Process Which is Performed by Terminal Device

Figure 12:
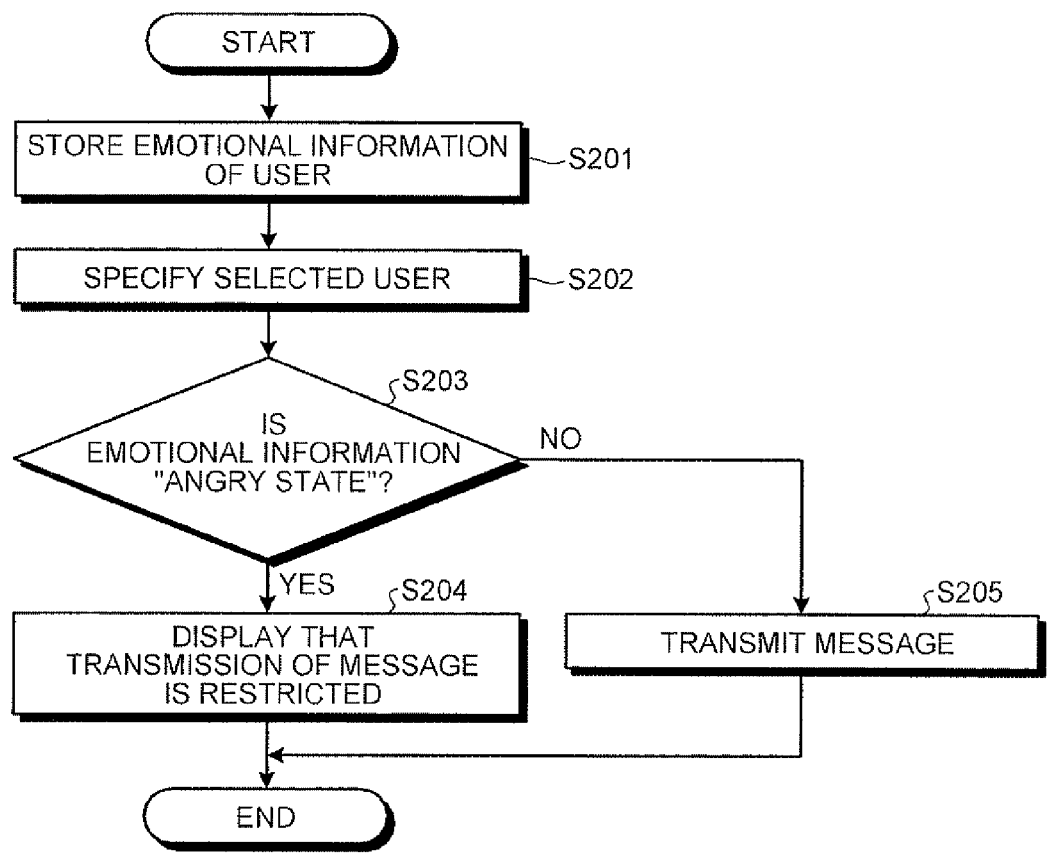
FIG. 12 is a flowchart illustrating a flow of a process which is performed by the terminal device according to the exemplary embodiment.

Next, a flow of a process of the terminal device 60 which controls to transmit the message in accordance with the emotion of the user will be described with reference to FIG. 12. FIG. 12 is a flowchart illustrating a flow of a process which is performed by the terminal device according to the exemplary embodiment. For example, in step S201, the terminal device 60 stores the emotional information received from the emotion determining server 40 through the social network server 50. Next, in step S202, the terminal device 60 specifies a selected user in a selection screen of a destination of the message. Here, in step S203, the terminal device 60 determines whether the emotional information of the selected user is "angry state".

If it is determined that the user's emotional information is a specific state, for example, "angry state" (Yes in step S203), the terminal device 60 displays that the transmission of the message is restricted in step S204 and ends the process. In the meantime, if it is determined that the user's emotional information is not "angry state", (No in step S203), the terminal device 60 displays the message input screen to receive the input of the message and transmits the input message in step S205 and ends the process.

8. Modified Embodiment

The information providing system 1 according to the exemplary embodiment may be carried out by various different embodiments other than the above-described exemplary embodiment. Hereinafter, another exemplary embodiment of the information providing system 1 will be described.

8-1. Regarding Social Network Server

In the above-described example, although the social network server 50 relays the message, but the exemplary embodiment is not limited thereto. For example, the social network server 50 may control transmission of the message or opening of the data in accordance with the emotion of the user.

For example, the emotional information management table 27, the updating unit 31, and the determining unit 33 which are illustrated in FIG. 2 are added to the above-described functional configuration of the social network server 50 so that the social network server 50 may control the transmission of the message in accordance with the emotion of the user. Further, the emotional information management table 27, the updating unit 31, and the determining unit 33 are added to the functional configuration of the social network server 50 so that a process to determine whether to open data such as the text or the picture posted by the user may be performed.

For example, the social network server 50 stores emotion specified by the emotion determining server 40. When a message for a user whose specified emotion is "angry state" is received, the social network server 50 does not transfer the message and notifies the transmission source of the message that the message cannot be transmitted. Therefore, the social network server 50 may restrict the contact with the user who is angry.

Further, for example, when the data posted by the user is requested to open, the social network server 50 determines whether the emotion of the user who is a posting source of the data is "angry state". When the emotion of the user who is the posting source of the data is "angry state", the social network server 50 transmits a fact that the data cannot open to restrict the opening of the data such as the text or the picture posted by the user. As described above, the social network server 50 may restrict the opening of the data posted by the user in accordance with the emotion of the user.

Further, as described above, the process that determines whether to open the data posted by the user in accordance with the emotion of the user may be performed by the terminal devices 20 and 60 rather than the social network server 50. For example, when the data posted by the user #2 is acquired, the terminal device 60 determines whether the emotion of the user #2 is "angry state" and if the emotion of the user #2 is "angry state", may display a fact that the data posted by the user #2 cannot be acquired.

8-2. Regarding Determination of Emotion

In the above-described exemplary embodiment, the emotion determining server 40 uses the latest emotional score acquired from the user to specify the emotion of the user.

However, the exemplary embodiment is not limited thereto. That is, if the emotion of the user is determined based on the emotional score acquired from the user, the emotion determining server 40 may use arbitrary method to determine the emotion of the user. For example, the emotion determining server 40 may discriminate biorhythm of the user from the emotional score acquired from the user or the biosensor value acquired from the user and determine the current emotion of the user in consideration of the discriminated biorhythm.

Further, the emotion of the user which is determined by the emotion determining server 40 is not limited to the above-described emotions. That is, the emotion determining server 40 may determine the emotion of the user at an arbitrary granularity.

8-3. Regarding Relation Between Emotion Determining Server and Social Network Server In order to transmit the emotional information to a friend of the user whose emotion is determined, the emotion determining server 40 transmits the emotional information to the social network server 50. However, the exemplary embodiment is not limited thereto. That is, if the emotion determining server 40 can discriminate the transmission destination of the emotional information, the emotional information may be output to the transmission destinations without passing through the social network server 50.

Further, the function of the emotion determining server 40 does not need to separate from the social network server 50. That is, the function which is demonstrated by the emotion determining server 40 and the function which is demonstrated by the social network server 50 may be implemented by one information processing device.

8-4. Whether to be Able to Transmit Message

In the above-described example, although it is described that when the emotion of the user who is the destination of the message is "angry state", the terminal device 20 restricts the transmission of the message, the exemplary embodiment is not limited thereto. For example, when the emotion of the user who is the destination of the message is the "ultra negative state", the terminal device 20 may restrict the transmission of the message. Further, when the emotion of the user which is destination of the message is the "negative state", the terminal device 20 receives the input of the message and also temporally waits the transmission of the message. When the emotion of the user who is the destination of the message is the "positive state" or the "ultra positive state", the terminal device 20 may transmit a message which temporally waits for the transmission.

8-5. Regarding Biological Information

The above-described terminal device 20 acquires the biosensor value from the user and calculates the emotional score using the acquired biosensor value. Further, the emotion determining server 40 uses the emotional score calculated by the terminal device 20 to specify the emotion of user. However, the exemplary embodiment is not limited thereto. For example, the terminal device 20 transmits the biosensor value acquired from the user to the emotion determining server 40 as it is. The emotion determining server 40 calculates the emotional score value from the biosensor value received from the terminal device 20 and uses the calculated emotional score value to specify the emotion of the user. Further, the emotion determining server 40 may not specify the emotion of the user from the emotional score, but determine the emotion of the user using the biosensor value as it is, such as a heart rate or an electro-dermal activity.

That is, in the above-described exemplary embodiment, the emotion determining server 40 may use the biological information including arbitrary information acquired from the user, such as the biosensor value or the emotional score to determine the emotion of the user. In the following description, arbitrary information which is acquired from the user such as the biosensor value or the emotional score is referred to as biological information.

8-6. Others

The above-described terminal devices 20 and 60 display icons representing the emotion of the friend on the screen which allows the user to select the destination of the message. However, the exemplary embodiment is not limited thereto. For example, if the emotions of the users are displayed on the screen which selects the point of contact such as an address book, in associated with the users, the terminal devices 20 and 60 may display the emotion of each user on an arbitrary screen.

Further, the functions of the above-described emotion determining server 40 and the social network server 50 may be implemented by a plurality of server devices using so-called cloud function. For example, the functions which are demonstrated by the receiving unit 45, the determining unit 46, and the notifying unit 47 included in the emotion determining server 40 may be implemented by different server devices.

Further, the functions which are demonstrated by the receiving unit 55 and the transmitting unit 56 included in the social network server 50 may be implemented by different server devices. Further, the process which is performed by the determining unit 33 included in the terminal device 20 may be performed on the social network server 50 or an arbitrary cloud, rather than in the terminal device 20.

Further, in the above-described exemplary embodiment, an example that the terminal devices 20 and 60 are terminals such as smart phone has been described. However, if the terminal devices 20 and 60 are display processing devices which may display various items of information, the terminal device may be applied to a device other than the terminal device such as the smart phone. For example, the terminal device 20 may be a tablet PC, a notebook computer, a desk top PC, or a personal digital assistant (PDA).

Further, among the processes described in the above-described exemplary embodiment, all or some of the processes which have been described to be automatically performed may be manually performed or all or some of the processes which have been described to be manually performed may be automatically performed by a known method. The processing procedure, specific name, or information including various data or parameters which has been described above or in the drawings may be arbitrarily changed if not specifically mentioned. For example, various items of information illustrated in the drawings are not limited to the illustrated information. For example, a user interface (UI) of the application illustrated in the drawings is not limited thereto.

Components of respective devices illustrated in the drawings are functional and conceptual components and do not need to have the physical configuration as described in the drawings. That is, the distributed and combined specific embodiment of the devices is not limited to the illustrated components, and all or some of the components may be functionally or physically distributed or integrated in an arbitrary unit in accordance with various loads or usage conditions. Further, the functions which are demonstrated by the components may be demonstrated when a central processing unit (CPU) executes a predetermined control program.

9. Effect

As described above, the emotion determining server 40 according to the exemplary embodiment collects biological information acquired from the user, determines the emotion of the user using the collected biological information, and outputs the emotional information representing the determined emotion and the information representing the user to the terminal devices which are used by other users. Therefore, when the users send messages, a mood of the user at the transmission destination is known in advance so that the emotion determining server 40 allow the user to determine whether to transmit the message in accordance with the mood of the user at the transmission destination.

Further, the emotion determining server 40 allows the terminal devices 20 and 60 to display the information representing the user and an icon representing the emotion of the user on the screen which selects the point of contact. Therefore, the emotion determining server 40 may allow the user to determine whether to contact the user at the point of contact in accordance with the emotion of the user at the point of contact.

Further, if the user's biological information falls within a predetermined range, the emotion determining server 40 determines that the user has a predetermined emotion. Therefore, the emotion determining server 40 may notify the mood of the user at the point of contact to the user.

Further, if it is determined that the user has a predetermined emotion, the emotion determining server 40 restricts the terminal devices 20 and 60 to provide a contact method of the user having a predetermined emotion. Therefore, when the user at the point of contact has a predetermined emotion, the emotion determining server 40 may restrict the contact from the user to the user at the point of contact.

If it is determined that the user has a predetermined emotion, the emotion determining server 40 restricts the social network server 50 to browse or open the data posted by the user. Here, the emotion determining server 40 may output the notice for restricting the browsing or opening of the data to the terminal devices which are used by other users. As a result, the emotion determining server 40 may control the opening of various data posted by the user in the SNS in accordance with the emotion of the user.

Further, when the emotion of the user is determined, the emotion determining server 40 outputs the notice for displaying an icon representing the user in a position corresponding to the determined emotion on the axis corresponding to strength of the emotion, to the terminal device 60. Therefore, the emotion determining server 40 may easily discriminate the emotion of the user at the point of contact.

Further, when the emotion of the user is determined, the emotion determining server 40 outputs the determined emotion to the terminal devices which are used by other users who are registered as friends of the user. Therefore, the emotion determining server 40 may allow the friend of the user who has an emotion to be determined to know the emotion of the user.

Further, the emotion determining server 40 acquires the biological information collected by the biological information acquiring device 10 which is mounted on the user. That is, the emotion determining server 40 uses the biological information which is collected by a wearable device which is mounted on the user to determine the emotion of the user. Therefore, the emotion determining server 40 may determine the emotion of the user in real time.

10. Program

Figure 13:
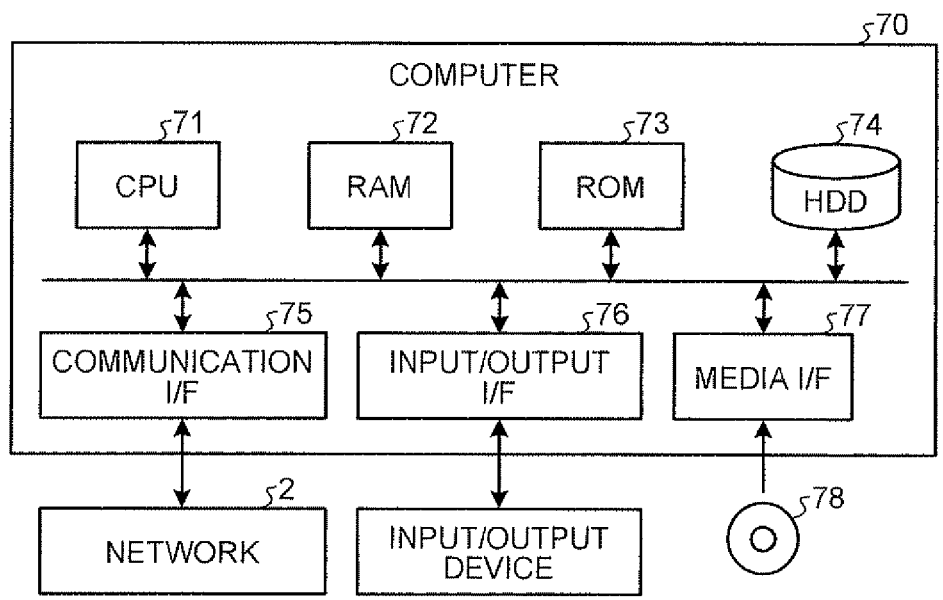
FIG. 13 is a diagram illustrating an example of a hardware configuration of a computer which executes a control program.

The emotion determining server 40 in the above-described exemplary embodiment is implemented when a computer 70 having a configuration illustrated in FIG. 13 executes an evaluation program. FIG. 13 is a diagram illustrating an example of a hardware configuration of a computer which executes a control program. The computer 70 includes a central processing unit (CPU) 71, a random access memory (RAM) 72, a read only memory (ROM) 73, a hard disk drive (HDD) 74, a communication interface (I/F) 75, an input/output interface (I/F) 76, and a media interface (I/F) 77.

The CPU 71 operates based on programs stored on the ROM 73 or the HDD 74 and controls each parts. The ROM 73 stores a boot program which is executed by the CPU 71 when the computer 70 is activated or a program depending on hardware of the computer 70.

The HDD 74 stores a control program executed by the CPU 71 and data which is used by the control program. For example, the HDD 74 stores data same as the emotional score management table 44. The communication interface 75 receives data from another equipment through the network 2 and sends the data to the CPU 71 and transmits the data created by the CPU 71 to the another equipment through the network 2.

The CPU 71 controls an output device such as a display or a printer and an input device such as a keyboard or a mouse through the input/output interface 76. The CPU 71 acquires data from the input device through the input/output interface 76. Further, the CPU 71 outputs the created data to the output device through the input/output interface 76.

The media interface 77 reads a control program or data stored in a recording medium 78 and provides the control program or the data to the CPU 71 through the RAM 72. The CPU 71 loads the program from the recording medium 78 onto the RAM 72 through the media interface 77 and executes the loaded program. The recording medium 78 is a recording medium in which the control program according to the exemplary embodiment is recorded and for example, is an optical recording medium such as a digital versatile disc (DVD) or a phase change rewritable disk (PD), an magnetic optical recording medium such as a magneto-optical disk (MO), a tape medium, a magnetic recording medium, or a semiconductor memory.

When the computer 70 serves as the emotion determining server 40 according to above-described exemplary embodiment, the CPU 71 of the computer 70 executes the program loaded on the RAM 72 to implement the functions of the receiving unit 45, the determining unit 46, and the notifying unit 47.

The CPU 71 of the computer 70 reads the control program from the recording medium 78 and executes the control program but may obtain the program from another device through the network 2 as another example.

According to an aspect of the exemplary embodiment, when a user wants to transmit a message, it is possible to check a mood of a user of a transmission destination in advance.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device, comprising:
   a collecting unit which collects user's biometric information;
   a determining unit which determines an emotion of the user by using a degree of the biological information collected by the collecting unit; and
   an output unit which outputs in association with information representing the user and the emotion of the user determined by the determining unit to terminal devices which are used by other users, wherein the output unit outputs a notice for displaying information representing the user in a position corresponding to the emotion determined by the determining unit in the screen that displays the emotion of the user to the terminal devices which are used by the other users, and wherein the output unit outputs a notice for restricting a contact method to the user to the terminal devices which are used by the other users if the determining unit determines that the user has a predetermined emotion and the terminal devices which receive the notice for restricting the contact method, restrict the contact method to the user.

2. The information processing device according to claim 1, wherein the output unit outputs a notice for displaying the emotion of the user on a screen which allows the other users to select a point of contact of the user to the terminal devices which are used by the other users.

3. The information processing device according to claim 1, wherein the determining unit determines that the user has the predetermined emotion if the user's biological information falls within a predetermined range.

4. An information processing device comprising:
    a collecting unit which collects user's biometric information;
    a determining unit which determines an emotion of the user by using a degree of the biological information collected by the collecting unit; and
    an output unit which outputs in association with information representing the user and the emotion of the user determined by the determining unit to terminal devices which are used by other users,
    wherein the output unit outputs a notice for displaying information representing the user in a position corresponding to the emotion determined by the determining unit in the screen that displays the emotion of the user to the terminal devices which are used by the other users, and
    wherein the output unit outputs a notice for restricting browsing of data posted by the user to the terminal devices which are used by the other users if the determining unit determines that the user has a predetermined emotion and the terminal devices which receive the notice for restricting the browsing, restrict browsing of the data posted by the user.

5. The information processing device according to claim 1, wherein the output unit outputs the information representing the user and the emotion of the user to a terminal device which is used by another user who is registered as a friend of the user whose emotion is determined by the determining unit.

6. The information processing device according to claim 1, wherein the collecting unit collects user's biological information acquired by a biological information acquiring device which is capable of being mounted on the user.

7. A control method performed by an information processing device, the control method comprising:
    collecting user's biological information;
    determining an emotion of the user by using a degree of the biological information collected at the collecting; and
    outputting in association with information representing the user and the emotion determined at the determining to terminal devices which are used by other users,
    wherein the outputting includes outputting a notice for displaying information representing the user in a position corresponding to the emotion determined at the determining in the screen which displays the emotion of the user to the terminal devices which are used by the other users, and
    wherein the outputting includes outputting a notice for restricting a contact method to the user to the terminal devices which are used by the other users if it is determined at the determining that the user has a predetermined emotion and further comprising restricting the contact method to the user from the terminal devices that receive he notice for restricting the contact method.

8. The control method according to claim 7, wherein the outputting includes outputting a notice for displaying the emotion of the user on a screen which allows the other users to select a point of contact of the user to the terminal devices which are used by the other users.

9. The control method according to claim 7, wherein the determining includes determining that the user has the predetermined emotion if the user's biological information falls within a predetermined range.

10. A control method performed by an information processing device, the control method comprising:
    collecting user's biological information;
    determining an emotion of the user by using a degree of the biological information collected at the collecting; and
    outputting in association with information representing the user and the emotion determined at the determining to terminal devices which are used by other users,
    wherein the outputting includes outputting a notice for displaying information representing the user in a position corresponding to the emotion determined at the determining in the screen which displays the emotion of the user to the terminal devices which are used by the other users, and
    wherein the outputting includes outputting a notice for restricting browsing of data posted by the user to the terminal devices which are used by the other users if it is determined at the determining that the user has a predetermined emotion and further comprising restricting the browsing to the data posted by the user from the terminal devices that receive the notice for restricting the browsing.

11. A non-transitory computer readable storage medium having stored therein a control program, the control program causing to execute a process, the process comprising:
    collecting user's biological information;
    determining an emotion of the user by using a degree of the biological information collected at the collecting; and
    outputting in association with information representing the user and the emotion determined at the determining to terminal devices which are used by other users,
    wherein the outputting includes outputting a notice for displaying information representing the user in a position corresponding to the emotion determined at the determining in the screen which displays the emotion of the user to the terminal devices which are used by the other users, and
    the outputting includes outputting a notice for restricting a contact method to the user to the terminal devices which are used by the other users if it is determined at the determining that the user has the predetermined emotion and further comprising restricting the contact method to the user from the terminal devices that receive the notice for restricting the contact method.

12. A non-transitory computer readable storage medium according to claim 11, the process wherein the outputting includes outputting a notice for displaying the emotion of the user on a screen which allows the other users to select a point of contact of the user to the terminal devices which are used by the other users.

13. A non-transitory computer readable storage medium according to claim 11, the process wherein
the determining includes determining that the user has the predetermined emotion if the user's biological information falls within a predetermined range.

14. A non transitory computer readable storage medium having stored therein a control program, the control program causing to execute a process, the process comprising:
collecting user's biological information;
determining an emotion of the user by using a degree of the biological information collected at the collecting; and
outputting in association with information representing the user and the emotion determined at the determining to terminal devices which are used by other users,
wherein the outputting includes outputting a notice for displaying information representing the user in a position corresponding to the emotion determined at the determining in the screen which displays the emotion of the user to the terminal devices which are used by the other users, and
the outputting includes outputting a notice for restricting browsing of data posted by the user to the terminal devices which are used by the other users if it is determined at the determining that the user has the predetermined emotion and further comprising restricting the browsing to the data posted b the user from the terminal devices that receive the notice for restricting the browsing.

* * * * *